US010126484B2

(12) United States Patent
Jeon et al.

(10) Patent No.: US 10,126,484 B2
(45) Date of Patent: Nov. 13, 2018

(54) OPTICAL MEMBER, BACKLIGHT UNIT AND DISPLAY DEVICE

(71) Applicant: LG ELECTRONICS INC., Seoul (KR)

(72) Inventors: Seongman Jeon, Seoul (KR);
Sangcheon Kim, Seoul (KR);
Byoungkwon Cho, Seoul (KR);
Hyunkwon Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/675,121

(22) Filed: Mar. 31, 2015

(65) Prior Publication Data

US 2016/0097892 A1 Apr. 7, 2016

(30) Foreign Application Priority Data

Oct. 1, 2014 (KR) ........................ 10-2014-0132599

(51) Int. Cl.
*F21V 8/00* (2006.01)
*G02F 1/1335* (2006.01)

(52) U.S. Cl.
CPC ......... *G02B 6/0051* (2013.01); *G02B 6/0031* (2013.01); *G02B 6/0033* (2013.01); *G02B 6/0055* (2013.01); *G02B 6/0068* (2013.01); *G02F 1/133605* (2013.01); *G02F 1/133615* (2013.01); *G02F 2001/133614* (2013.01)

(58) Field of Classification Search
None
See application file for complete search history.

(56) References Cited

U.S. PATENT DOCUMENTS

| 2006/0103589 | A1 | 5/2006 | Chua et al. |
| 2010/0182532 | A1 | 7/2010 | Lin et al. |
| 2010/0283072 | A1 | 11/2010 | Kazlas et al. |
| 2011/0006316 | A1 | 1/2011 | Ing et al. |
| 2011/0273864 | A1* | 11/2011 | Izawa ................ C09K 11/7741 362/84 |
| 2012/0113672 | A1* | 5/2012 | Dubrow ................ B82Y 20/00 362/602 |
| 2013/0265522 | A1 | 10/2013 | Jung et al. |
| 2014/0022819 | A1 | 1/2014 | Oh et al. |
| 2014/0036203 | A1 | 2/2014 | Guillou et al. |

(Continued)

FOREIGN PATENT DOCUMENTS

| EP | 2 871 408 | | 5/2015 | |
| JP | 01131624 A | * | 5/1989 | ............... A47G 1/00 |

(Continued)

OTHER PUBLICATIONS

Korean Office Action dated Sep. 16, 2015.
(Continued)

*Primary Examiner* — Edward Glick
*Assistant Examiner* — Anthony G Quash
(74) *Attorney, Agent, or Firm* — KED & Associates, LLP (57) ABSTRACT

An optical member, backlight unit and display device are provided. The optical member includes: a reflective substrate including a base member, a reflective layer disposed on the base member, and a plurality of refractive layers disposed on the reflective layer; an optical conversion layer disposed on the reflective substrate; and a barrier substrate disposed on the optical conversion layer.

9 Claims, 5 Drawing Sheets

(56) References Cited

U.S. PATENT DOCUMENTS

2015/0131028 A1* 5/2015 Oh .................. G02B 6/005
349/65
2016/0061417 A1* 3/2016 Kim ................ G02F 1/133603
349/62

FOREIGN PATENT DOCUMENTS

| JP | 06-010929 A | | 1/2006 | | |
|---|---|---|---|---|---|
| JP | 2008-147147 | | 6/2008 | | |
| KR | 1020050093047 | * | 9/2005 | ......... | G02F 1/13357 |
| KR | 10-0047841 A | | 5/2010 | | |
| KR | 12-0075142 A | | 7/2012 | | |
| KR | 10-2013-0112990 | | 10/2013 | | |
| KR | 14-0038062 A | | 3/2014 | | |
| WO | WO 2012/138038 A1 | | 10/2012 | | |
| WO | WO 2012138038 A1 | * | 10/2012 | ............. | G02B 6/005 |

OTHER PUBLICATIONS

European Office Action dated May 16, 2017 issued in Application No. 15000605.4.
Korean Office Action dated Sep. 5, 2016 issued in Application No. 10-2016-0071238.

* cited by examiner

ically as a flat panel display device (FPD) having advantages in thin thickness, light weight and low power consumption, have quickly replaced a typical cathode ray tubes (CRT) and have taken center stage.

OPTICAL MEMBER, BACKLIGHT UNIT AND DISPLAY DEVICE

CROSS-REFERENCE TO RELATED APPLICATION(S)

This application claims the benefit of Korean Patent Application No. 10-2014-0132599, filed on Oct. 1, 2014, which is hereby incorporated by reference in its entirety into this application.

BACKGROUND

1. Field

The present disclosure relates to an optical member, a backlight unit and a display device, and more particularly to, an optical member achieving high color reproduction accuracy and having high efficiency, and a backlight unit and display device including the same.

2. Background

In recent, a display field has also developed at a fast speed to keep pace with the information age, and a liquid crystal display device (LCD), a plasma display panel device (PDP), an electroluminescence display device (ELD), and a field emission display device (FED) have been accordingly introduced as a flat panel display device (FPD) having advantages in thin thickness, light weight and low power consumption, have quickly replaced a typical cathode ray tubes (CRT) and have taken center stage.

Among others, the LCD is taking center stage as a next-generation display device that enables low power consumption, provides good mobility, is technology-intensive and provides a high added value. In particular, an active matrix LCD (AM-LCD) which includes a thin film transistor capable of regulating power on/off for each pixel and in which pixel electrodes connected to the thin film transistor are arranged in a matrix form is taking center stage due to high resolution and an excellent video reproduction capability.

The LCD includes a liquid crystal display panel including a lower substrate, an upper substrate and a liquid crystal layer between both substrates, and a backlight unit supplying light to the liquid crystal display panel. That is, the LCD is a device in which light is supplied from the backlight unit to the liquid crystal display panel, the transmittance of light is regulated depending on the arrangement of the liquid crystal layer of the liquid crystal display panel, and an image is displayed depending thereon.

The backlight unit includes a light source unit and is divided into an edge type and a direct-lit type depending on the location of the light source unit. The light source unit may be a blue light-emitting diode that generates a blue light. In this case, there is a need for an optical conversion member that may convert the wavelength of incident light and emit converted light. That is, the optical conversion member may convert the blue light into green and red lights and thus, a white light in which the blue light, the green light and the red light are mixed may enter the AM-LCD.

In the case of the edge type, the backlight unit includes a light guide plate, a reflective plate, a light source unit, an optical sheet, an optical conversion member and a bottom casing accommodating them. In this case, the light source unit is disposed on a lateral face of the bottom casing and light enters the lateral face of the light guide plate. The optical conversion member is disposed on the light guide plate and between the light guide plate and the optical sheet.

In the case of the direct-lit type, the backlight unit includes a diffusion plate, a reflective plate, a light source unit, an optical sheet, an optical conversion member and a bottom casing accommodating them. In this case, the light source unit is disposed on the internal top surface of the bottom casing and light enters the rear surface of the light guide plate. The optical conversion member is disposed on the light source unit.

That is, the optical conversion member is disposed on the light guide plate or the light source unit. A portion of light emitted from the light source unit is emitted to the liquid crystal display panel, and a portion of light is recycled to be back reflected and is then emitted back to the liquid crystal display panel. In this case, the light recycled may be re-absorbed by the optical conversion member. Thus, there is a limitation in that light efficiency decreases.

Also, the optical conversion member includes two substrates facing each other and an optical conversion layer that is disposed between the two substrates. That is, there is a limitation in decreasing a thickness because the optical conversion member needs the two substrates disposed on and under the optical conversion layer and the thicknesses of the backlight unit and the AM-LCD increase due to the thicknesses of the substrates.

SUMMARY

Embodiments provide an optical member, a backlight unit, and a display device that include a reflective substrate including a plurality of refractive layers to enhance reflection efficiency and light efficiency and include an optical conversion layer to enhance color reproduction accuracy.

Also, embodiments provide an optical member, a backlight unit, and a display device that include integrally-formed barrier substrate, optical conversion layer and reflective substrate having enhanced reflection efficiency so that one member is capable of functioning as the reflective plate and the optical conversion member.

Also, embodiments provide an optical member, a backlight unit, and a display device that include integrally-formed barrier substrate, optical conversion layer and reflective substrate so that it is possible to decrease a thickness, simplify a structure and reduce manufacturing costs.

Also, embodiments provide an optical member, a backlight unit, and a display device that prevent recycled light from becoming re-absorbed in an optical conversion layer and enhance light efficiency by disposing the optical member including a barrier substrate, the optical conversion layer and a reflective substrate under a light guide plate or on the lateral part of a light source unit.

In one embodiment, an optical member includes: a reflective substrate including a base member, a reflective layer disposed on the base member, and a plurality of refractive layers disposed on the reflective layer; an optical conversion layer disposed on the reflective substrate; and a barrier substrate disposed on the optical conversion layer.

In another embodiment, a backlight unit includes: a light source unit; and an optical member reflecting light emitted from the light source unit, and including a reflective substrate, an optical conversion layer disposed on the reflective substrate, and a barrier substrate disposed on the optical conversion layer, wherein the reflective substrate includes a base member, a reflective layer disposed on the base member and a plurality of refractive layers disposed on the reflective layer.

In further another embodiment, a display device includes: a backlight unit and a display panel disposed on the backlight unit, wherein the backlight unit includes: a light source unit; and an optical member reflecting light emitted from the light source unit, and including a reflective substrate, an optical conversion layer disposed on the reflective substrate, and a barrier substrate disposed on the optical conversion layer, wherein the reflective substrate includes a base member, a reflective layer disposed on the base member and a plurality of refractive layers disposed on the reflective layer.

Since the optical member, backlight unit and display device according to the embodiments include the reflective substrate including a plurality of refractive layers, it is possible to enhance reflection efficiency. Also, since the reflection efficiency is enhanced, it is possible to enhance light efficiency. Also, since the embodiments include the optical conversion layer, it is possible to enhance color reproduction accuracy.

Also, since the optical member, backlight unit, and display device according to the embodiments include integrally-formed barrier substrate, optical conversion layer and reflective substrate having enhanced reflection efficiency, one member is capable of functioning as both the reflective plate and the optical conversion member. That is, since the barrier substrate, the optical conversion layer and the reflective substrate are integrally formed, it is possible to decrease a thickness. Also, the embodiments may simplify a structure and reduce manufacturing costs.

Also, the optical member, backlight unit, and display device according to the embodiments may prevent recycled light from becoming re-absorbed in the optical conversion layer by disposing the optical member including the barrier substrate, the optical conversion layer and the reflective substrate under the light guide plate or on the lateral part of the light source unit. Thus, it is possible to enhance light efficiency.

The details of one or more embodiments are set forth in the accompanying drawings and the description below. Other features will be apparent from the description and drawings, and from the claims.

BRIEF DESCRIPTION OF THE DRAWINGS

The embodiments will be described in detail with reference to the following drawings in which like reference numerals refer to like elements wherein.

DETAILED DESCRIPTION

The advantages and features of the inventive concept, and implementation methods thereof will be clarified through the following embodiments described with reference to the accompanying drawings. The inventive concept may, however, be embodied in different forms and should not be construed as limited to the embodiments set forth herein. Rather, these embodiments are provided to make this disclosure complete and fully convey the scope of the inventive concept to a skilled in the art. Further, the inventive concept is only defined by the scopes of claims.

Since shape, size, proportion, angle and number of components depicted in the drawings for explaining embodiments are exemplary, the inventive concept is not limited to those shown. The same reference numerals throughout the disclosure refer to the same components. When describing the inventive concept, detailed descriptions of related known configurations will be ruled out in order not to unnecessarily obscure subject matters of the present disclosure.

When the present disclosure uses the terms 'comprises', 'has' and 'includes', another component may be added unless 'only' is represented in corresponding sentence. A singular component includes plural components unless otherwise specified.

In construing a component, it is construed that an error range is included even if there is no separate explicit mention.

When describing a location relationship between two components by using e.g., 'on', on the top of', 'under', or 'next to', another component may also be located between the two components unless 'directly' is not represented in a corresponding sentence.

When describing a temporal relationship by using e.g., 'after', 'subsequently to', 'next', or 'before', a discontinuous relationship may also be included unless 'immediately' or 'directly' is not represented in a corresponding sentence.

The terms 'first and 'second' are used to describe various components, but these components are not limited by these terms. These terms are only used to distinguish a component from another. Thus, a first component mentioned below may also be a second component in the technical spirit of the inventive concept.

The characteristics of many embodiments may be combined or mixed partially or generally, it is possible to technologically implement various links and operations, and embodiments may also be practiced independently from one another or together depending on one another.

In the following, embodiments are described in detail with reference to the drawings. The following embodiments are provided as examples so that the spirit of the inventive concept may be sufficiently delivered to a person skilled in the art. Thus, the inventive concept is not limited embodiments to be described below but may be implemented in other forms. In addition, the size and thickness of a device in the drawings may be exaggerated for convenience. The same reference numerals represent the same components throughout the disclosure.

Figure 1:
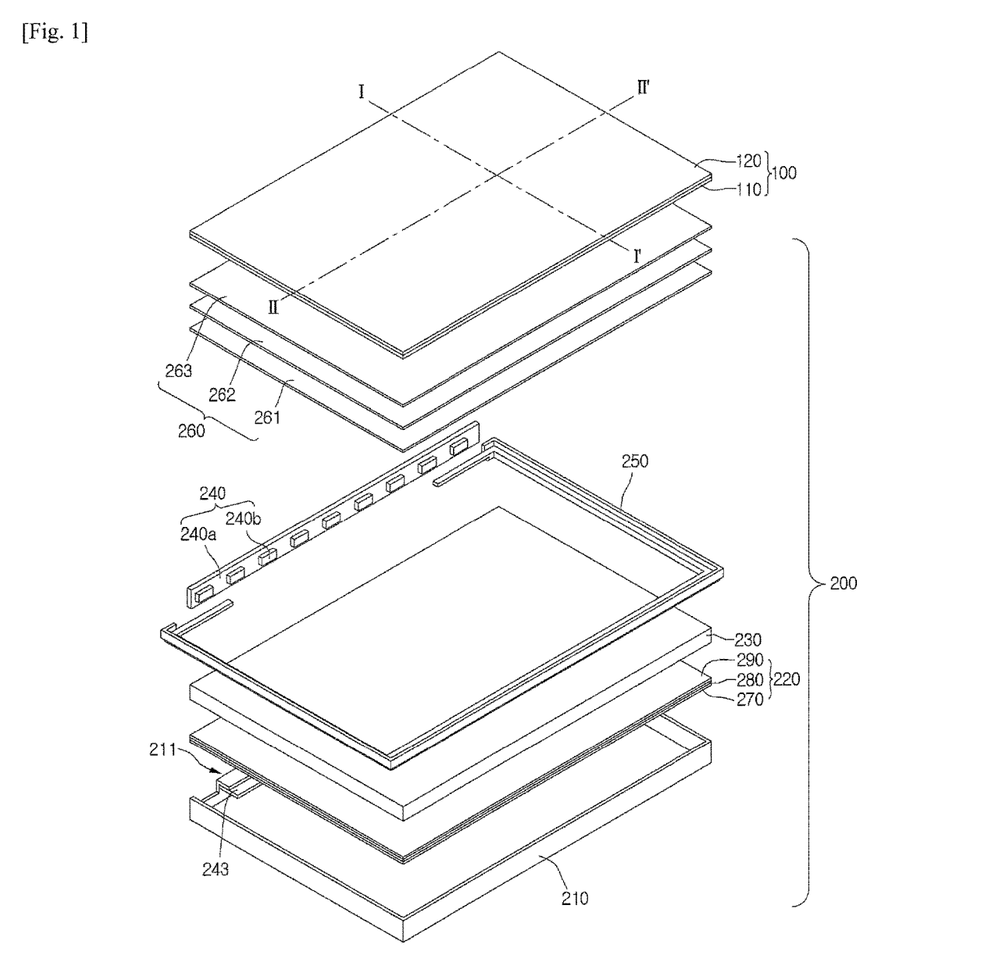
FIG. 1 is an exploded perspective view of a display device according to an embodiment.
Figure 2:
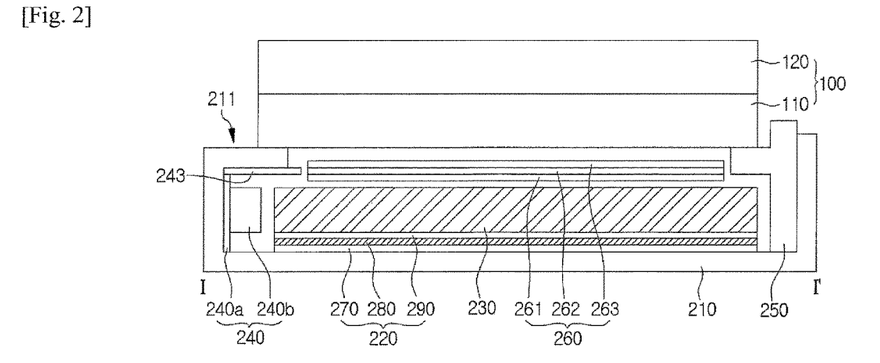
FIG. 2 is a cross-sectional view taken along line I-I' in FIG. 1.
Figure 3:
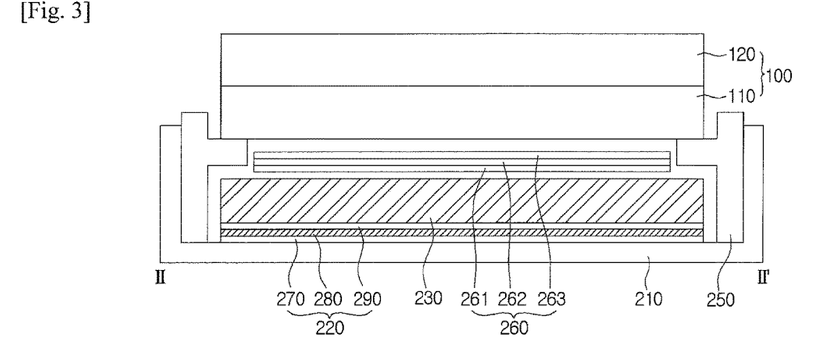
FIG. 3 is a cross-sectional view taken along line II-II' in FIG. 1.
Figure 4:
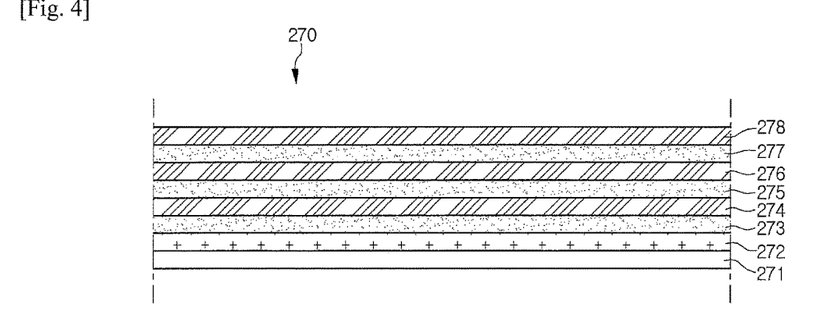
FIGS. 4 and 5 are diagrams for explaining a reflective substrate of a display device according to an embodiment.
Figure 5:
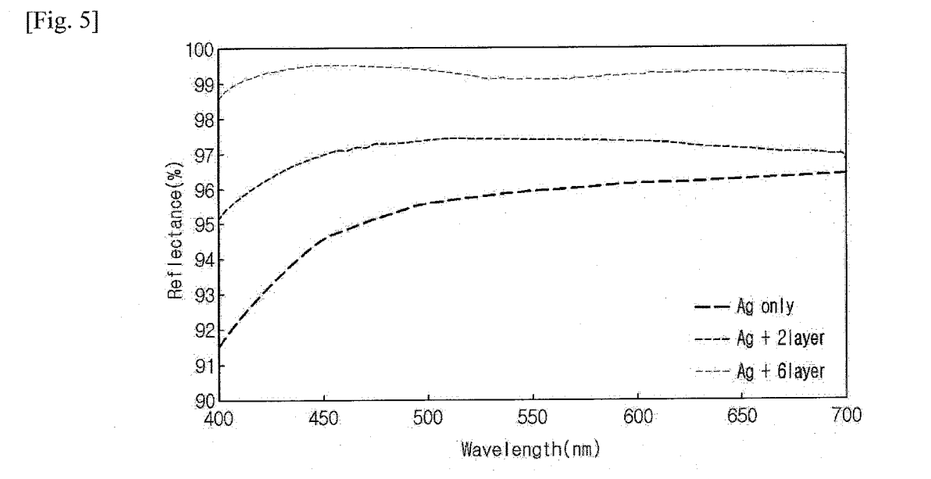
Figure 6:
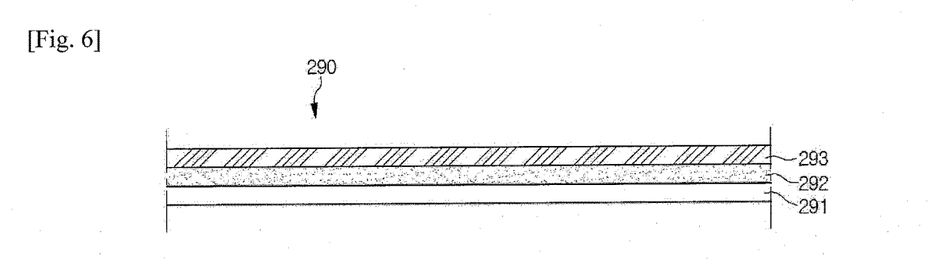
FIG. 6 is a diagram for explaining a barrier substrate of a display device according to an embodiment.

Firstly, an optical member, a backlight unit, and a display device including them according to an embodiment are described with reference to FIGS. 1 to 6. FIG. 1 is an exploded perspective view of a display device according to an embodiment. FIG. 2 is a cross-sectional view taken along line I-I' in FIG. 1. FIG. 3 is a cross-sectional view taken along line II-II' in FIG. 1. FIGS. 4 and 5 are diagrams for explaining the reflective substrate of a display device according to an embodiment. FIG. 6 is a diagram for explaining a barrier substrate of a display device according to an embodiment.

Referring to FIGS. 1 to 3, the display device according to an embodiment includes a display panel 100 and a backlight unit 200. In particular, the display panel 100 includes a first substrate 110 and a second substrate 120 that are bonded to each other, with a liquid crystal layer (not shown) therebetween.

Also, a polarizer (not shown) that selectively transmits only a specific polarization may be further disposed on the external surface of the first substrate 110 and second substrate 120. That is, the polarizer may be disposed at the top of the first substrate 110 and the bottom of the second substrate 120, though not shown.

The display panel is divided into a display area and a non-display area, though not particularly shown. On the display area, a gate line and a data line are disposed on one surface of the first substrate 110. The gate line and the data line vertically intersect to define a pixel area, a gate dielectric being disposed between the gate line and the data line.

The first substrate 110 may be a thin film transistor (TFT) substrate. On one surface of the first substrate 110, a TFT is disposed on an area at which the gate line and the data line intersect. That is, the pixel area includes the TFT. Also, a pixel electrode is disposed on each pixel area on one surface of the first substrate 110. The TFT is electrically connected to the pixel electrode.

The TFT includes a gate electrode, a semiconductor layer, a source electrode and a drain electrode. The gate electrode may branch from the gate line. Also, the source electrode may be formed from the data line. The pixel electrode may be electrically connected to the drain electrode of the TFT.

The TFT may be formed in a bottom gate structure, a top gate structure or a double gate structure. That is, the configuration of the TFT may be changed and modified without departing from the technical spirit of the embodiment.

The second substrate 120 may be a color filter substrate. A lattice-shaped black matrix which covers the non-display area including the TFT disposed on the first substrate and surrounds the pixel area 110 is disposed on one surface of the second substrate 120 of the display panel 100. Also, red, green and blue color filter layers are included which are sequentially disposed to correspond to each pixel area in the lattice.

Also, the display panel 100 includes a common electrode forming an electric field with the pixel electrode in order to drive the liquid crystal layer. A mode of regulating the arrangement of liquid crystal molecules include a twisted nematic (TN), vertical alignment (VA), in plane switching (IPS) or fringe field switching mode. The common electrode may be disposed on the first substrate 110 or the second substrate 120 according to the mode of regulating the arrangement of the liquid crystal molecules.

Also, the display panel 100 may also be the display panel 100 having a color filter on transistor (COT) structure in which the TFT, the color filter layer and the black matrix are disposed on the first substrate 110. The second substrate 120 and the first substrate 110 are bonded to each other, with the liquid crystal layer therebetween.

That is, the TFT may be disposed on the first substrate 110 and the color filter layer may be disposed on the TFT. In this case, a protective layer may be disposed between the TFT and the color filter layer.

Also, the pixel electrode being in contact with the TFT is disposed on the first substrate 110. In this case, in order to enhance an aperture ratio and simplify a mask process, it is also possible to form the common electrode without the black matrix, in which case the common electrode also has the function of the black matrix.

Also, the display panel 100 is connected to a driving circuit unit (not shown) that supplies a driving signal externally, though not shown. The driving circuit unit may be mounted on the substrate of the display panel 100 or connected to the display panel 100 through a connection member such as a tape carrier package.

The display panel 100 needs a separate light source because it is not a self-emissive device. The backlight unit 200 is disposed on one surface of the display panel 100 to provide light to the display panel 100. In this case, the display panel 100 may control an electric field applied to liquid crystal to adjust the transmittance of light provided from the backlight unit 200 and display an image.

The backlight unit 200 according to the embodiment may include a bottom casing 210, a light source unit 240, a light wave plate 230, an optical member 220, an optical sheet 260, and a guide panel 250. The backlight unit 200 may be an edge-type backlight unit 200.

The light source unit 240 may be disposed on an internal lateral face of the bottom casing 210. Although figures show that the light source unit 240 is disposed only on a lateral face of the bottom casing 210, the inventive concept is not limited thereto. The light source unit 240 may also be disposed on facing sides in the bottom casing 210.

The bottom casing 210 has an open top. Also, the bottom casing 210 has a sidewall extended in the form of a closed curve in order to accommodate the light source unit 240, the light wave plate 230, the optical member 220, and the optical sheet 260. In this case, at least one sidewall of the bottom casing 210 may include a bent extended portion 211 that is extended from the upper edge of the sidewall and then bent and covers the light source unit 240. That is, a cross section of a lateral face of the bottom casing 210 may have the shape of the letter 'C'.

The light source unit 240 may be disposed on the sidewall having the shape of the alphabet letter 'C' of the bottom case 210. In this case, a reflective member 243 may be further disposed on the lower surface of the bent, extended portion 211.

The reflective member 243 may be a light source housing, a reflective film or a reflective film. The reflective member 243 may prevent light from the light source unit 240 from becoming emitted directly to the display panel 100. Also, the reflective member 243 may increase a quantity of light entering the light guide plate 230. Thus, the reflective member 243 may enhance the light efficiency, brightness and quality of the display device.

Also, the bent, extended portion 211 may not be provided for the bottom casing 210. That is, a cross section of a lateral face of the bottom casing 210 may have the shape of the alphabet letter 'L'. The bottom casing 210 is coupled to the guide panel 250.

The guide panel 250 includes a protrusion portion therein. The display panel 100 may be placed on the protrusion portion of the guide panel 250 and supported by the protrusion portion. The guide panel 250 may also be called a support main or mold frame.

The guide panel 250 surrounds the edge of the backlight unit 200 in order to be bonded to the display panel 100. That is, the guide panel 250 has a frame shape. For example, the guide panel 250 may have the shape of a quadrilateral frame. Also, the guide panel 250 may have an opening on an area corresponding to the bent, extended portion 211 of the bottom casing 210.

For assembling or coupling, the bottom casing 210 and the guide panel 250 may have a hook shape or include a protrusion portion and a recess portion respectively, though not shown. Also, the bottom casing 210 and the guide panel 250 may be bonded through an adhesive member.

However, the inventive concept is not limited to the drawing and the guide panel 250 may also be disposed on the light source unit 240. In this case, the reflective member 243 may be disposed on the lower surface of the guide panel 250 corresponding to the light source unit 240.

The light source unit 240 includes a plurality of light sources 240b and a printed circuit board (PCB) 240a on which the plurality of light sources 240b are mounted. The light source 240b may generate a blue light. That is, the light source 240b may emit a blue light that has a wavelength band between about 430 nm and about 470 nm. For example, the light source 240b may be a blue light-emitting diode.

The PCB 240a is electrically connected to the light source 240b. The light source 240b may receive a driving signal through the PCB 240a and operate.

The PCB 240a has a mounting surface on which the light source 240b is mounted, and an adhesive surface facing the mounting surface. The adhesive surface of the PCB 240a is attached to the bottom casing 210. The PCB 240a has a bar shape may be disposed on a lateral face of the bottom casing 210.

Although FIGURES show that the PCB 240a is attached to an internal side of the bottom casing 210, the inventive concept is not limited thereto. The PCB 240a may also be attached to the internal top of the bottom casing 210 or to the lower surface of the bent, extended portion 211 of the bottom casing 210.

The light wave plate 230 may convert an incident point source into a surface light source. That is, the light wave plate 230 plays a role in uniformly guiding light provided from the light source unit 240 to the liquid crystal panel 100 through total reflection, refraction and scattering. In this example, the light wave plate 230 is accommodated in the bottom casing 210.

Although figures show that the light wave plate 230 has a constant thickness, the shape of the light wave plate 230 is not limited thereto. For example, the thickness of the central portion of the light wave plate 230 may be thinner than opposite sides of the light wave plate 230 in order to decrease the total thickness of the backlight unit 200 and the thickness of the light wave plate may become gradually thinner away from the light source unit 240.

Also, a surface of the light wave plate 230 may include a specific pattern in order to supply a uniform surface light source. For example, the light wave plate 230 may include various patterns, such as an elliptical pattern, a polygonal pattern, and a hologram pattern in order to guide incident light.

The optical sheet 260 for diffusion and concentration is disposed on the light guide plate 230. For example, the optical sheet 260 may include a diffusion sheet 261, a first prism sheet 262, and a second prism sheet 263.

The diffusion sheet 261 is disposed on the light guide plate 230. The diffusion sheet 261 enhances the uniformity of transmitted light. The diffusion sheet 261 may include a plurality of beads.

The first prism sheet 262 is disposed on the diffusion sheet 261. The second prism sheet 263 is disposed on the first prism sheet 262. The first prism sheet 262 and the second prism sheet 263 increase the linearity of transmitted light. Thus, since light emitted onto the light wave plate 230 passes through the optical sheet 260, the light may be processed to be a surface light source having high brightness.

The optical member 220 is disposed on a path through which the light emitted from the light source unit 240 passes. Specifically, the optical member 220 is disposed between the light wave plate 230 and the bottom casing 210. That is, the optical member 220 is disposed under the light wave plate 230.

The optical member 220 includes a reflective substrate 270, an optical conversion layer 280 disposed on the reflective substrate 270, and a barrier substrate 290 disposed on the optical conversion layer 280.

The barrier substrate 290 may transmit light and support and protect the optical conversion layer 280. The barrier substrate 290 may prevent the optical conversion layer 280 from deteriorating due to moisture or oxygen in the external air.

The reflective substrate 270 may support and protect the optical conversion layer 280. Also, the reflective substrate 270 may reflect light entering through the barrier substrate 290 and the optical conversion layer 270, upwards.

The optical conversion layer 280 may convert the characteristics of incident light. The optical conversion layer 280 may convert the wavelength of incident light. Since the optical member 220 includes the optical conversion layer 280, it is possible to implement a white light having excellent optical characteristics and enhance color reproduction accuracy.

The optical conversion layer 280 may have a state in which a quantum dot is mixed and cured. The quantum dot is a light-emitting nano-particle and means a particle of a certain size having a quantum confinement effect.

The quantum dot is a semiconductor crystal of several nanometers nm generated through a chemical synthesis process, converts the wavelength of light injected from the light source 240b and emits converted light. In this case, the wavelength of emitted light varies depending on the size of the quantum dot to be capable of reproducing all colors of visible rays. For example, the diameter of the quantum dot may be about 1 nm to about 10 nm.

In particular, when the size of the quantum dot is smaller than that of the Bohr radius of an exciton that an electron and hole excited by light or electricity generates, there is the quantum confinement effect, thus the quantum has a discrete energy level and the size of the energy gap varies. Also, since an electric charge is confined in the quantum dot, it is possible to have high light efficiency.

The quantum dot may include a core nano-crystal and a shell nano-crystal surrounding the core nano-crystal. Also, the quantum dot may include an organic ligand bound to the shell nano-crystal. The organic ligand may include pyridine, mercapto alcohol, thiol, phosphine and phosphine oxide.

The organic ligand plays a role in stabilizing an instable quantum dot after synthesis. After synthesis, a dangling bond is formed on the outside of the quantum dot, and because of the dangling bond, the quantum dot may become instable. However, since one end of the organic ligand is a non-binding state, the non-binding end of the organic ligand may be bound to the dangling bond to stabilize the quantum dot. Also, the quantum dot may include an organic coated layer surrounding the shell nano-crystal. The shell nano-crystal may be formed in two or more layers. The shell nano-crystal is formed on the surface of the core nano-crystal. The quantum dot may extend the wavelength of light entering the core nano-crystal through the shell nano-crystal forming a shell layer to increase light efficiency.

The quantum dot may be a group II-VI, III-V, or IV material. For example, the quantum dot may be CdSe, CdTe, CdS, ZnSe, ZnTe, ZnS, InP, GaP, GaInP$_2$, PbS, ZnO, TiO$_2$, AgI, AgBr, HgI$_2$, PbSe, In$_2$S$_3$, In$_2$Se$_3$, Cd$_3$P$_2$, Cd$_3$As$_2$, GaAs, and any one selected from the group consisting of combinations thereof.

Also, the quantum dot may have a core-shell structure. In this example, the core CdSe, CdTe, CdS, ZnSe, ZnTe, ZnS, HgTe, HgS, and any material selected from the group consisting of combinations thereof, and the shell may include CdSe, CdTe, CdS, ZnSe, ZnTe, ZnS, HgTe, HgS, and any material selected from the group consisting of combinations thereof.

The quantum dot may obtain light having various wavelengths according to a quantum size effect. That is, it is possible to easily obtain various colors including red, green and blue depending on the size of the quantum dot.

Since the quantum dot having the quantum confinement effect has excellent color purity, it is possible to obtain a white light having excellent optical characteristics. Also, since the quantum dot has 100 times to 1000 times larger extinction coefficient than a general dye and has a high quantum yield, it is possible to generate strong fluorescence.

Also, since fluorescent wavelength of the quantum dot varies depending on the size of a particle unlike a general fluorescent dye. Thus, since it is possible to reproduce various color lights through the resizing of the quantum dot, it is possible to easily obtain various color lights by using a single light source according to a used quantum dot.

For example, when the light source 240b is a blue light-emitting diode, the optical conversion layer 280 may convert an incident blue light into a green light or a red light. That is, the blue light entering from the light source 240b is converted into a red light having a wavelength band between about 630 nm to about 660 nm or a green light having a wavelength band between about 520 nm to about 560 nm in the process of passing through the optical conversion layer 280. Specifically, the wavelength of a blue light may be converted into the wavelength of a red light by a red quantum dot, and the wavelength of the blue light may be converted into the wavelength of a green light by a green quantum dot.

Thus, a blue light emitted without conversion and the green light and red light converted by the optical conversion layer 280 may be mixed to generate a white light. Thus, a white light having excellent optical characteristics may enter the display panel 100.

The optical conversion member is typically disposed on the light wave plate 230, and apart from the optical conversion member, the reflective plate is disposed between the light wave plate 230 and the bottom casing 210. In this case, the optical conversion member includes an optical conversion layer disposed between a lower substrate and an upper substrate.

That is, apart from the reflective plate, two substrates are needed. Due to the two substrates for supporting the optical conversion layer, the thicknesses of the backlight unit and the display device increase and there is a limitation in decreasing a thickness.

Thus, in the optical member 220 according to an embodiment, the reflective substrate 270, the optical conversion layer 280 and the barrier substrate 290 are integrally formed. That is, the optical member 220 according to an embodiment may replace a substrate supporting the optical conversion layer 280 with the reflective substrate 270.

Thus, the optical member 220 may decrease a thickness. Specifically, it is possible to exclude at least one substrate for supporting the optical conversion layer 280. Also, since the optical member 220 may functions as both the reflective substrate and the optical conversion member, it is possible to simplify a structure and reduce manufacturing costs.

In particular, the edge-type backlight unit 200 and the display device in which the light source unit 240 is disposed on a lateral face of the bottom casing 210 has a great effect on decreasing a thickness. The edge-type backlight unit 200 and the display device, a space on which the light source unit 240 occupies is disposed on a lateral portion thereof. Thus, it is possible to minimize a thickness due to the light source unit 240, and an effect caused by excluding a substrate from the optical conversion member may be maximized.

Also, the optical conversion member is typically disposed on the light wave plate 230 and is specifically disposed between the light wave plate 230 and the optical sheet 260. In this case, a portion of light between the light wave plate 230 and the optical sheet 260 is recycled, a portion of recycled light is re-absorbed in the optical conversion member and thus there is optical loss. Thus, there is a limitation in that light efficiency decreases.

Thus, the optical member 220 including the optical conversion layer 280 according to an embodiment is disposed under the light wave plate 230. Thus, it is possible to prevent re-absorption between the light wave plate 230 and the optical sheet 260, the limitation in that there is optical loss is improved, and it is possible to enhance efficiency.

Also, when the optical conversion member is disposed under the light wave plate 230 as before, there is a limitation in that the reflection efficiency of the reflective plate decreases. In order to improve the limitation, the reflective substrate 270 of the optical member 220 according to an embodiment includes a plurality of refractive layers. Related descriptions are provided below in detail.

Referring to FIG. 4, the reflective substrate 270 includes a plurality of layers. For example, the reflective substrate 270 includes a base member 271, a reflective layer 272 disposed on the base member 271, and a plurality of refractive layers 273 to 278 disposed on the reflective layer 272.

The base member 271 plays a role in supporting the reflective layer 272 and the plurality of refractive layers. The base member 271 may be a plastic film. For example, the base member 271 may be formed from polyethylene terephthalate (PET). However, the inventive concept is not limited thereto and the base member 271 may be formed from a material that may support the reflective layer 272 and the plurality of refractive layers.

The reflective layer 272 is formed from a material that has excellent light reflectance. For example, the reflective layer 272 may be formed from silver (Ag). The reflective layer 272 may be a layer that is obtained by applying metal paste to the base member 271 and then curing them.

The plurality of refractive layers 273 to 278 may be two or more refractive layers. FIG. 4 shows a first refractive layer 273, a second refractive layer 274, a third refractive layer 275, a fourth refractive layer 276, a fifth refractive layer 277, and a sixth refractive layer 273, the inventive concept is not limited thereto. The plurality of refractive layers may include two to eight refractive layers.

The plurality of refractive layers 273 to 278 may be formed by alternately disposing a low-refractive layer and a high-refractive layer. In this case, the top layer of the refractive layers may be a high-refractive layer. For example, the first, third and fifth refractive layers 273, 275 and 277 may be low-refractive layers and the second, fourth and sixth refractive layers 274, 276 and 278 may be high-refractive layers.

The low-refractive layer may have a refractive index of about 1.3 to about 1.4. Also, the high-refractive layer may have a refractive index of about 1.6 to about 2.5.

When the plurality of refractive layers includes a plurality of high-refractive layers, the plurality of high-refractive layers may be formed from the same material or different materials. For example, the high-refractive layer may be formed from ZnS, ZnO, ITO, $TiO_2$, $Nb_2O_5$ and any one selected from the group consisting of combinations thereof.

Also, when the plurality of refractive layers includes a plurality of low-refractive layers, the plurality of low-refractive layers may be formed from the same material or different materials. For example, the low-refractive layer may be formed from $SiO_2$, $MgF_2$, $Al_2O_3$, $BaF_2$ and any one selected from the group consisting of combinations thereof.

When the optical conversion member is typically disposed between the reflective plate and the light guide plate, there is a limitation in that the reflection efficiency of the reflective plate decreases. Thus, the optical member 220 according to an embodiment includes the reflective substrate 270 having enhanced reflection efficiency. The reflection efficiency of the reflective substrate 270 according to an embodiment is as follows.

Referring to FIG. 5, wavelength vs. reflectance is shown when only a silver (Ag) reflective layer 272 (Ag only) is disposed on the base member 271, two refractive layers including a low-refractive layer and a high-refractive layer (Ag+2 layer) are disposed on the silver (Ag) reflective layer 272, and six refractive layers formed by alternately disposing a low-refractive layer and a high-refractive layer (Ag+6 layer) are disposed on the silver (Ag) reflective layer 272.

A typical reflective plate includes only the reflective layer 272 disposed on the base member 271. The reflectance of the typical reflective plate may significantly vary depending on a wavelength as shown in Ag only. That is, the difference in reflectance between light having a long wavelength and light having a short wavelength is significant. Typically, there is a limitation in that the reflectance of the light having the short wavelength is remarkably lower than that of the light having the long wavelength.

Thus, the reflective substrate 270 according to an embodiment includes a plurality of refractive layers. When two refractive layers including a low-refractive layer and a high-refractive layer are on the reflective layer 272, the reflectance of all wavelength bands may be enhanced in comparison to when only the reflective layer 272 is included as before. In particular, it is possible to obtain high reflectance characteristics evenly at short and long wavelengths.

Also, when six refractive layers on which a low-reflective layer and a high-refractive layer are alternately disposed are disposed on the reflective layer 272, it may be seen that it is possible to obtain a reflectance of about 99% at all wavelength bands.

In particular, the optical member 220 according to an embodiment may include the reflective substrate 270 optimized for the optical conversion layer 280. Thus, even though the optical conversion layer 280 is disposed under the light wave plate 230, the reflectance may be enhanced.

That is, the material and thickness of the plurality of refractive layers may vary depending on the optical conversion layer 280. For example, when the plurality of refractive layers include the first to sixth refractive layers 273 to 278, the thicknesses of refractive layers may be different.

The thickness of the first refractive layer 273 may be about 60 nm to about 70 nm, the thickness of the second refractive layer 274 may be about 50 nm to about 60 nm, the thickness of the third refractive layer 275 may be about 85 nm to about 95, the thickness of the fourth refractive layer 276 may be about 48 nm to about 58 nm, the thickness of the fifth refractive layer 277 may be about 38 nm to about 48 nm, and the thickness of the sixth refractive layer 278 may be about 22 nm to about 32 nm. That is, the optical member 220 according to an embodiment may regulate the thickness of each refractive layer to be capable of representing reflection efficiency optimized for the optical conversion layer 280.

The optical member 220 includes the barrier substrate 290 that supports and protects the optical conversion layer 280. The barrier substrate 290 is described below in more detail.

Referring to FIG. 6, the barrier substrate 290 may include the base member 291 and the plurality of refractive layers 292 and 293. Although FIG. 6 shows that the barrier substrate 290 includes the base member 291, the first refractive layer 292, and the second refractive layer 293, the inventive concept is not limited thereto. The barrier substrate 290 may include only the base member 291. Also, when the barrier substrate 290 includes a plurality of refractive layers, the plurality of refractive layers may include two to eight refractive layers. The base member 291 may be disposed to be in direct contact with the optical conversion layer 280. The base member 291 may be formed from a material through which light passes. For example, the base member 291 may be formed from PET. However, the inventive concept is not limited thereto and the base member 291 may be formed from a material that may support the optical conversion layer 280 and protect the optical conversion layer 280 from external moisture, oxygen or physical impact.

The plurality of refractive layers 292 and 293 may further enhance the reflection efficiency of the optical member 220. Also, the plurality of refractive layers 292 and 293 may not only perform an optical function but also protect the optical conversion layer 280 from external physical or chemical impact.

The plurality of refractive layers 292 and 293 may be two or more refractive layers. Although FIG. 6 shows the first refractive layer 292 and the second refractive layer 293, the inventive concept is not limited thereto. The plurality of refractive layers may include two to eight refractive layers.

The plurality of refractive layers 292 and 293 may be formed from an organic or inorganic material. For example, the first refractive layer 292 may be an inorganic material and the second refractive layer 293 may be an organic material. Also, both the first refractive layer 292 and the second refractive layer 293 may be inorganic materials. That is, the plurality of refractive layers 292 and 293 may be formed from the same material or different materials.

Also, the plurality of refractive layers 292 and 293 may be formed by alternately disposing a low-refractive layer and a high-refractive layer in order to enhance reflection efficiency. In this case, the top refractive layer may be a high-refractive layer in order to maximize reflection efficiency. For example, the first refractive layer 292 may be a low-refractive layer and the second refractive layer 293 may be a high-refractive layer.

The low-refractive layer may have a refractive index of about 1.3 to about 1.4. Also, the high-refractive layer may have a refractive index of about 1.6 to about 2.5.

When the plurality of refractive layers includes a plurality of high-refractive layers, the plurality of high-refractive layers may be formed from the same material or different materials. For example, the high-refractive layer may be formed from ZnS, ZnO, ITO, $TiO_2$, $Nb_2O_5$ and any one selected from the group consisting of combinations thereof.

Also, when the plurality of refractive layers includes a plurality of low-refractive layers, the plurality of low-refractive layers may be formed from the same material or different materials. For example, the low-refractive layer may be formed from $SiO_2$, $MgF_2$, $Al_2O_3$, $BaF_2$ and any one selected from the group consisting of combinations thereof.

Thus, even though the optical conversion layer 280 is disposed under the light wave plate 230, reflection efficiency may be enhanced through the reflective substrate 270 and the barrier substrate 290. In particular, the optical member 220 according to an embodiment may regulate the thickness of each refractive layer to be optimized for the optical conversion layer 280 and thus improve reflection efficiency.

Figure 7:
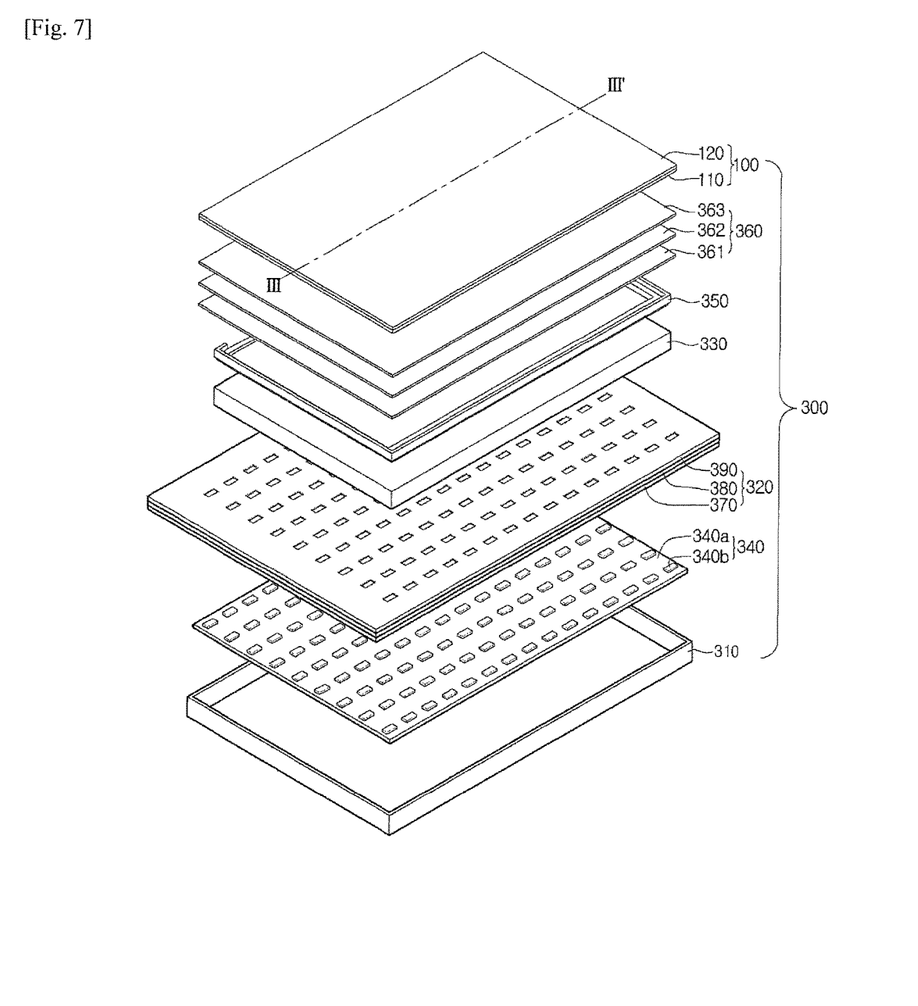
FIG. 7 is an exploded perspective view of a display device according to another embodiment.
Figure 8:
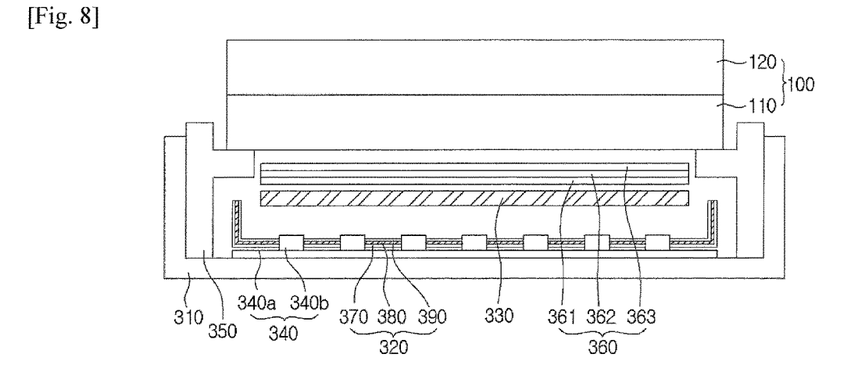
FIG. 8 is a cross-sectional view taken along line III-III' in FIG. 7.
Figure 9:
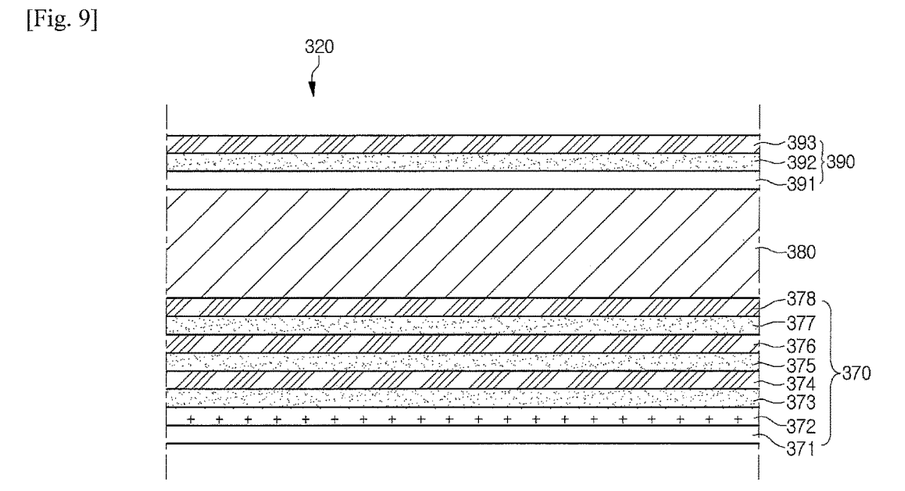
FIG. 9 is a diagram for explaining an optical member of a display device according to an embodiment.

Subsequently, an optical member, a backlight unit, and a display device including them according to another embodiment are described with reference to FIGS. 7 to 9. FIG. 7 is an exploded perspective view of a display device according to another embodiment. FIG. 8 is a cross-sectional view taken along line III-III' in FIG. 7. FIG. 9 is a diagram for explaining an optical member of a display device according to an embodiment.

A backlight unit according to another embodiment and a liquid crystal display (LCD) device including the same may include the same or similar components as the backlight unit according to the above-described embodiment and the LCD display device including the same. Descriptions provided in the embodiment above may not be provided in the present embodiment. The same components use the same reference numerals.

Referring to FIGS. 7 to 8, the display device according to an embodiment includes a display panel 100 and a backlight unit 300. In particular, the display panel 100 includes first and second substrates 110 and 120 bonded to each other, with a liquid crystal layer (not shown) therebetween.

Also, a polarizer (not shown) that selectively transmits only a specific polarization may be further disposed on the external surfaces of the first substrate 110 and second substrate 120. That is, the polarizer may be disposed at the top of the first substrate 110 and the bottom of the second substrate 120.

The first substrate 110 may be a TFT substrate and the second substrate 120 may be a color filter substrate. That is, a TFT including a gate electrode, a gate dielectric, a semiconductor layer, a source electrode and a drain electrode may be disposed on the first substrate 110, and a pixel electrode being in contact with the TFT may be disposed thereon. Also, a lattice-shaped black matrix and a color filter layer may be disposed on the second substrate 120.

Also, the display panel 100 may have a color filter on transistor (COT) structure in which the color filter layer and the black matrix are also disposed on the first substrate 110. That is, the TFT may be disposed on the first substrate 110, a protective layer may be disposed on the TFT, and the color filter layer may be disposed on the protective layer. Also, the pixel electrode being in contact with the TFT may be disposed on the first substrate 110. In this case, in order to enhance an aperture ratio and simplify a mask process, it is also possible to form the common electrode without the black matrix, in which case the common electrode also has the function of the black matrix.

The backlight unit 300 is disposed on one surface of the display panel 100 to provide light to the display panel 100. In this case, the display panel 100 may control an electric field applied to a liquid crystal to adjust the transmittance of light provided from the backlight unit 300 and display an image.

The backlight unit 300 according to the embodiment may include a bottom casing 310, a light source unit 340, a diffusion plate 330, an optical member 320, an optical sheet 360, and a guide panel 350. The backlight unit 300 may be a direct-lit backlight unit 300.

The bottom casing 310 has an open top. Also, the bottom casing 310 has a sidewall extended in the form of a closed curve in order to accommodate the light source unit 340, the diffusion plate 330, the optical member 320, and the optical sheet 360.

The bottom casing 310 may be coupled to the guide panel 350. The guide panel 350 surrounds the edge of the backlight unit 200 in order to be bonded to the display panel 100 and is disposed to have a closed-curve shape. That is, the guide panel 350 has a frame shape. For example, the guide panel 350 may have the shape of a quadrilateral frame.

The guide panel 350 includes a protrusion portion therein. The display panel 100 may be placed on the protrusion portion of the guide panel 350 and supported thereby. The guide panel 350 may be assembled to the bottom casing 310 or the display panel 100 through an adhesive member or a coupling member. That is, the guide panel 350 may play a role in assembling the bottom casing 310 and the display panel 100.

The light source unit 340 includes a plurality of light sources 340b and a PCB 340a on which the plurality of light sources 340b are mounted. The PCB 340a is electrically connected to the light source 340b. The light source 340b may receive a driving signal through the PCB 340a and operate.

The light source unit 340 may be disposed on the internal top of the bottom casing 310. That is, the light source unit 340 may be disposed at the entire bottom of the bottom casing 310.

Specifically, the PCB 340a has a mounting surface on which the light source 340b is mounted, and an adhesive surface facing the mounting surface. The adhesive surface of the PCB 340a is attached to the bottom casing 310. The PCB 340a has a plate shape and may be disposed at the entire bottom of the bottom casing 310.

The light source 340b may generate a blue light. That is, the light source 340b may emit a blue light that has a wavelength band between about 430 nm and about 470 nm. For example, the light source 340b may be a blue light-emitting diode.

The diffusion plate 330 is disposed on the light source unit 340. The diffusion plate 330 enables light emitted from the light source unit 340 to travel toward the display panel 10 and enter at a wide range of angles.

The diffusion plate 330 may be a component obtained by coating both sides of a film formed of a transparent resin with an optical diffusion member. Also, the diffusion plate 330 may include various patterns. Thus, it is possible to widen a scattering area where light emitted from the light source unit 340 enters the diffusion plate 330, and increase the scattering efficiency of light.

The optical sheet 360 for diffusion and concentration is disposed on the diffusion plate 330. For example, the optical sheet 360 may include a diffusion sheet 361, a first prism sheet 362, and a second prism sheet 363.

The diffusion sheet 361 is disposed on the diffusion plate 330. The diffusion sheet 361 enhances the uniformity of transmitted light. The diffusion sheet 361 may include a plurality of beads.

The first prism sheet 362 is disposed on the diffusion sheet 361. The second prism sheet 363 is disposed on the first prism sheet 362. The first prism sheet 362 and the second prism sheet 363 increase the linearity of transmitted light. Thus, since light emitted onto the diffusion plate 330 passes through the optical sheet 360, the light may be processed to be a surface light source having high brightness.

The optical member 320 is disposed on the light source unit 340. Specifically, the optical member 320 is disposed on the PCB 340a of the light source unit 340. Also, the optical member 320 may include a plurality of holes so that the plurality of light sources 340b may be coupled.

That is, the plurality of light sources 340b is inserted into the plurality of holes of the optical member 320 and the light source 340b may be exposed to the outside through the hole. Thus, the optical member 320 may be disposed on a lateral face of the light source 340b on the PCB 340a.

In this case, the optical member 320 may be formed larger than the PCB 340a of the light source unit 340. Also, the optical member 320 may be disposed to be folded at the edge of the bottom casing 310. That is, the optical member 320 may be extended in an upward direction to correspond to the sidewall of the bottom casing 310.

Although FIGURES show that the optical member 320 is extended in a vertical direction, the inventive concept is not limited thereto. The optical member 320 only needs to be extended upwards and the optical member 320 only needs to have a structure in which light leaked laterally is reflected to the inside of the diffusion plate 330. Accordingly, sine the light emitted laterally is reflected to and enters the inside of the diffusion plate 330, it is possible to enhance light efficiency. The detailed configuration of the optical member 320 is described below in more detail.

Referring to FIG. 9, the optical member 320 includes a reflective substrate 370, an optical conversion layer 380 disposed on the reflective substrate 370, and a barrier substrate 390 disposed on the optical conversion layer 380.

The optical conversion layer 380 may convert the characteristics of incident light. The optical conversion layer 380 may convert the wavelength of incident light. Since the optical member 320 includes the optical conversion layer 380, it is possible to implement a white light having excellent optical characteristics and enhance color reproduction accuracy.

The optical conversion layer 380 may have a state in which a quantum dot is mixed and cured. The diameter of the quantum dot may be about 1 nm to about 10 nm.

Since the quantum dot has excellent color purity, it is possible to obtain a white light having excellent optical characteristics. Also, since the quantum dot has 100 times to 1000 times larger extinction coefficient than a general dye and has a high quantum yield, it is possible to generate strong fluorescence.

Also, since fluorescent wavelength of the quantum dot varies depending on the size of a particle unlike a general fluorescent dye. Thus, since it is possible to reproduce various color lights through the resizing of the quantum dot, it is possible to easily obtain various color lights by using a single light source according to a used quantum dot.

When the light source 340b is a blue light-emitting diode, the optical conversion layer 380 may convert an incident blue light into a green light or a red light. That is, the blue light entering from the light source 340b is converted into a red light having a wavelength band between about 630 nm to about 660 nm or a green light having a wavelength band between about 520 nm to about 560 nm in the process of passing through the optical conversion layer 380. Specifically, the wavelength of a blue light may be converted into the wavelength of a red light by a red quantum dot, and the wavelength of the blue light may be converted into the wavelength of a green light by a green quantum dot.

Thus, a blue light emitted without conversion and the green light and red light converted by the optical conversion layer 380 may be mixed to generate a white light. Thus, a white light having excellent optical characteristics may enter the display panel 100.

The reflective substrate 370 may support and protect the optical conversion layer 380. Also, the reflective substrate 370 may reflect light entering through the barrier substrate 390 and the optical conversion layer 380, back upwards.

The reflective substrate 370 includes a plurality of layers. For example, the reflective substrate 370 includes a base member 371, a reflective layer 372 disposed on the base member 371, and a plurality of refractive layers 373 to 378 disposed on the reflective layer 372.

The base member 371 plays a role in supporting the reflective layer 372 and the plurality of refractive layers. Also, the reflective layer 372 is formed from a material that has excellent light reflectance.

The plurality of refractive layers 373 to 378 may be two or more refractive layers. FIG. 9 shows a first refractive layer 373, a second refractive layer 374, a third refractive layer 375, a fourth refractive layer 376, a fifth refractive layer 377, and a sixth refractive layer 378, the inventive concept is not limited thereto. The plurality of refractive layers may include two to eight refractive layers.

The plurality of refractive layers 373 to 378 may be formed by alternately disposing a low-refractive layer and a high-refractive layer. The low-refractive layer may have a refractive index of about 1.3 to about 1.4. Also, the high-refractive layer may have a refractive index of about 1.6 to about 2.5.

In this case, the top layer of the refractive layers may be a high-refractive layer. For example, the first, third and fifth refractive layers 373, 375 and 377 may be low-refractive layers and the second, fourth and sixth refractive layers 374, 376 and 378 may be high-refractive layers.

The plurality of refractive layers may be formed from the same material or different materials. For example, the high-refractive layer may be formed from ZnS, ZnO, ITO, $TiO_2$, $Nb_2O_5$ and any one selected from the group consisting of combinations thereof. For example, the low-refractive layer may be formed from $SiO_2$, $MgF_2$, $Al_2O_3$, $BaF_2$ and any one selected from the group consisting of combinations thereof.

When a low-refractive layer and a high-refractive layer are alternately disposed on the reflective layer 372 which is disposed on the base member 371, a reflectance may be less affected by a wavelength in comparison to when only the reflective layer 372 is disposed on the base member 371. That is, the difference in reflectance between long-wavelength light and short-wavelength light may decrease, and it is possible to obtain a high reflectance characteristic evenly at short and long wavelengths.

In particular, when six or more refractive layers on which a low-reflective layer and a high-refractive layer are alternately disposed are disposed on the reflective layer 372, it is possible to obtain a reflectance of about 99% at all wavelength bands.

Also, the optical member 320 according to an embodiment may include the reflective substrate 370 optimized for the optical conversion layer 380. That is, the material and thickness of the plurality of refractive layers may vary depending on the optical conversion layer 380. For example, when the plurality of refractive layers includes the first to sixth refractive layers 373 to 378, the thicknesses of refractive layers may be different.

The thickness of the first refractive layer 373 may be about 60 nm to about 70 nm, the thickness of the second refractive layer 374 may be about 50 nm to about 60 nm, the thickness of the third refractive layer 375 may be about 85 nm to about 95, the thickness of the fourth refractive layer 376 may be about 48 nm to about 58 nm, the thickness of the fifth refractive layer 377 may be about 38 nm to about 48 nm, and the thickness of the sixth refractive layer 378 may be about 22 nm to about 32 nm. That is, the optical member 320 according to an embodiment may regulate the thickness of each refractive layer to be capable of representing reflection efficiency optimized for the optical conversion layer 380.

The barrier substrate 390 may transmit light and support and protect the optical conversion layer 380. That is, the barrier substrate 390 may prevent the optical conversion layer 380 from deteriorating due to moisture or oxygen in the external air.

The barrier substrate 390 may include the base member 391 and a plurality of refractive layers 392 and 393. Although FIG. 9 shows that the barrier substrate 390 includes the base member 391, the first refractive layer 392, and the second refractive layer 393, the inventive concept is not limited thereto. The barrier substrate 390 may include only the base member 391. Also, when the barrier substrate 390 includes a plurality of refractive layers, the plurality of refractive layers may include two to eight refractive layers.

The base member 391 may be disposed on the optical conversion layer 380 to be in direct contact with the optical conversion layer 380. The base member 391 may be formed from a material through which light passes. Also, the base member 391 may support the optical conversion layer 380 and protect the optical conversion layer 380 from external moisture, oxygen or physical impact.

The plurality of refractive layers 392 and 393 may further enhance the reflection efficiency of the optical member 320. Also, the plurality of refractive layers 392 and 393 may not only perform an optical function but also protect the optical conversion layer 380 from external physical or chemical impact.

The plurality of refractive layers 392 and 393 may be two or more refractive layers. Although FIG. 9 shows the first refractive layer 392 and the second refractive layer 393, the inventive concept is not limited thereto. The plurality of refractive layers may include two to eight refractive layers.

The plurality of refractive layers 392 and 393 may be formed from an organic or inorganic material. For example, the first refractive layer 392 may be an inorganic material and the second refractive layer 393 may be an organic material. Also, both the first refractive layer 392 and the second refractive layer 393 may be inorganic materials. That is, the plurality of refractive layers 392 and 393 may be formed from the same material or different materials.

Also, the plurality of refractive layers 392 and 393 may be formed by alternately disposing a low-refractive layer and a high-refractive layer in order to enhance reflection efficiency. The low-refractive layer may have a refractive index of about 1.3 to about 1.4. Also, the high-refractive layer may have a refractive index of about 1.6 to about 2.5.

In this case, the top refractive layer may be a high-refractive layer in order to maximize reflection efficiency. For example, the first refractive layer 392 may be a low-refractive layer and the second refractive layer 393 may be a high-refractive layer.

When the plurality of refractive layers includes a plurality of high-refractive layers, the plurality of high-refractive layers may be formed from the same material or different materials. For example, the high-refractive layer may be formed from ZnS, ZnO, ITO, $TiO_2$, $Nb_2O_5$ and any one selected from the group consisting of combinations thereof.

Also, when the plurality of refractive layers includes a plurality of low-refractive layers, the plurality of low-refractive layers may be formed from the same material or different materials. For example, the low-refractive layer may be formed from $SiO_2$, $MgF_2$, $Al_2O_3$, $BaF_2$ and any one selected from the group consisting of combinations thereof.

Thus, the optical member 320 may provide enhanced reflection efficiency through the reflective substrate 370 and the barrier substrate 390. In particular, the optical member 320 according to an embodiment may regulate the thickness of each refractive layer to be optimized for the optical conversion layer 380 and thus improve reflection efficiency.

Thus, since the optical member, backlight unit and display device according to embodiments include a reflective substrate including a plurality of refractive layers, it is possible to enhance reflection efficiency. Also, since the reflection efficiency is enhanced, light efficiency may be enhanced. Also, since the embodiments include the optical conversion layer, it is possible to enhance color reproduction accuracy. Also, since the barrier substrate, optical conversion layer and reflective substrate having enhanced reflection efficiency are integrally formed, one member is capable of functioning as both the reflective plate and the optical conversion member. That is, since the barrier substrate, optical conversion layer and the reflective substrate are integrally formed, it is possible to decrease a thickness, simplify a structure and reduce manufacturing costs. Also, since the optical member including the barrier substrate, optical conversion layer and reflective substrate is disposed under the light wave plate or on a lateral face of the light source unit, it is possible to prevent recycled light from becoming re-absorbed in the optical conversion layer. Thus, it is possible to enhance light efficiency.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of the inventive concept.

Embodiments are mostly described above. However, they are only examples and do not limit the inventive concept. A person skilled in the art may appreciate that many variations and applications not presented above may be implemented without departing from the essential characteristic of embodiments. For example, each component particularly represented in embodiments may be varied. In addition, it should be construed that differences related to such a variation and such an application are included in the scope of the inventive concept defined in the following claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a bottom casing;
   a light source unit installed on one side of the bottom casing;
   a reflective substrate comprising a first base member that directly contacts a top surface of the bottom casing, a reflective layer that directly contacts a top surface of the first base member and a first plurality of refractive layers, a lowest refractive layer of the first plurality of refractive layers directly contacting a top surface of the reflective layer, wherein the first base member is a plastic film, and the reflective layer includes silver, and metal paste is to couple the first base member to the reflective layer;
   an optical conversion layer directly contacting a top surface of a highest refractive layer of the first plurality of refractive layers and including quantum dots;
   a barrier substrate comprising a second base member that directly contacts a top surface of the optical conversion layer and a second plurality of refractive layers, a lowest refractive layer of the second plurality of refractive layers directly contacting a top surface of the second base member;
   a light wave plate directly contacting a top surface of a highest refractive layer of the second plurality of refractive layers and configured to guide light from the light source unit upwardly and downwardly; and
   an optical sheet disposed on a top surface of the light wave plate,
   wherein the second plurality of refractive layers includes low-refractive layers and high-refractive layers therebetween, and a refractive index of the high-refractive layer is higher than a refractive index of the low-refractive layer,
   wherein the first plurality of refractive layers includes low-refractive layers and high-refractive layers alternately disposed therebetween, the low-refractive layers being formed from $SiO_2$, $MgF_2$, $Al_2O_3$ or $BaF_2$, and the high-refractive layers being formed from ZnS, ZnO, ITO, $TiO_2$ or $Nb_2O_5$,
   wherein the first base member, the reflective layer, the first plurality of refractive layers, the optical conversion layer, the second base member, and the second plurality of refractive layers have an integral structure to constitute an optical member.

2. The backlight unit according to claim 1, wherein the light source unit includes a circuit board and a plurality of light sources on the circuit board, and
   the optical member is on the circuit board and the optical member includes a plurality of holes, and the light sources are provided at the plurality of holes.

3. The backlight unit according to claim 2, further comprising:
   a diffusion plate on the optical member; and
   an optical sheet on the diffusion sheet.

4. The backlight unit according to claim 1, wherein a top layer of the first plurality of refractive layers is a high-refractive layer.

5. The backlight unit according to claim 1, wherein the low-refractive layer has a refractive index of approximately 1.3 to approximately 1.4, and the high-refractive layer has a refractive index of approximately 1.6 to approximately 2.5.

6. The backlight unit according to claim 1, wherein the first plurality of refractive layers includes two to eight refractive layers.

7. The backlight unit according to claim 1, wherein the second plurality of refractive layers of the barrier substrate includes two to eight refractive layers.

8. A display device comprising:
   a backlight unit and a display panel on the backlight unit, wherein the backlight unit includes:
     a bottom casing;
     a light source unit installed on one side of the bottom casing;
     a reflective substrate comprising a first base member that directly contacts a top surface of the bottom casing, a reflective layer that directly contacts a top surface of the first base member and a first plurality of refractive layers, a lowest refractive layer of the first plurality of refractive layers directly contacting a top surface of the reflective layer, wherein the first base member is a plastic film, and the reflective layer includes silver, and metal paste is to couple the first base member to the reflective layer;
     an optical conversion layer directly contacting a top surface of a highest refractive layer of the first plurality of refractive layers and including quantum dots;
     a barrier substrate comprising a second base member that directly contacts a top surface of the optical conversion layer and a second plurality of refractive layers, a lowest refractive layer of the second plurality of refractive layers directly contacting a top surface of the second base member;
     a light wave plate directly contacting a top surface of a highest refractive layer of the second plurality of refractive layers and configured to guide light from the light source unit upwardly and downwardly; and
     an optical sheet disposed on a top surface of the light wave plate,
   wherein the second plurality of refractive layers including low-refractive layers and high-refractive layers therebetween, and a refractive index of the high-refractive layer is higher than a refractive index of the low-refractive layer,
   wherein the first plurality of refractive layers includes low-refractive layers and high-refractive layers alternately disposed therebetween, the low-refractive layers being formed from $SiO_2$, $MgF_2$, $Al_2O_3$ or $BaF_2$, and the high-refractive layers being formed from ZnS, ZnO, ITO, $TiO_2$ or $Nb_2O_5$,
   wherein the first base member, the reflective layer, the first plurality of refractive layers, the optical conversion layer, the second base member, and the second plurality of refractive layers have an integral structure to constitute an optical member.

9. The display device according to claim 8, wherein the display panel includes a first substrate and a second substrate, the second substrate being bonded to the first substrate, and a liquid crystal layer disposed between the first substrate and the second substrate.

* * * * *